(No Model.)

C. W. BANKS.
SPOOL CRADLE FOR SEWING MACHINES.

No. 359,198. Patented Mar. 8, 1887.

Witnesses
Norris A. Clark.
Hugh D. Healy.

Inventor
Charles W. Banks.
By his Attorneys
H. S. Snow & Co.

United States Patent Office.

CHARLES W. BANKS, OF PHILADELPHIA, PENNSYLVANIA, ASSIGNOR TO GEORGE G. THOMSON, OF SAME PLACE.

SPOOL-CRADLE FOR SEWING-MACHINES.

SPECIFICATION forming part of Letters Patent No. 359,198, dated March 8, 1887.

Application filed October 6, 1886. Serial No. 215,471. (No model.)

*To all whom it may concern:*

Be it known that I, CHARLES W. BANKS, a citizen of the United States, residing at Philadelphia, in the county of Philadelphia and State of Pennsylvania, have invented certain new and useful Improvements in Spool-Cradles; and I do hereby declare the following to be a full, clear, and exact description of the invention, such as will enable others skilled in the art to which it appertains to make and use the same.

My invention relates to an improved spool-cradle for sewing-machines. The object I have in view is to obtain a spool-holding device which will allow of an even and easy paying off of the thread, and which will also enable the operator to easily and quickly place the spool in position and remove it when desired.

To the accomplishment of the above the invention consists of a cradle formed of any suitable material, formed with straight parallel ends and curved sides and bottom, the same being open at its top and provided in its rear face with a vertical eye adapted to fit over a suitable spindle formed upon the arm of the machine.

Figure 1:
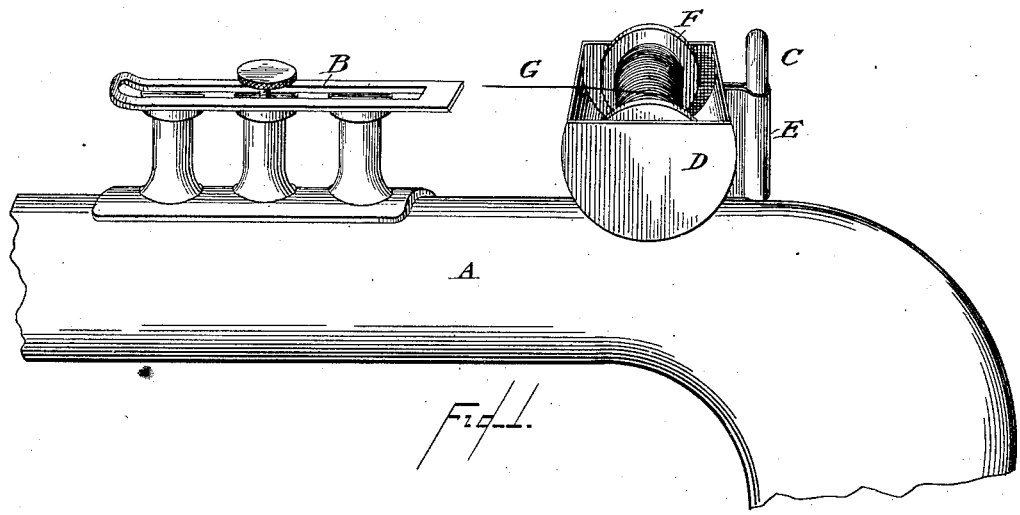
Figure 2:
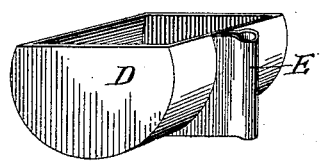
Figure 3:
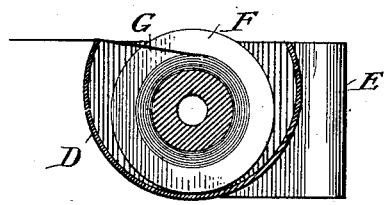

Reference will be made to the accompanying drawings, in which Figure 1 is a perspective view showing the device in position on the arm of the machine, said arm being broken away; Fig. 2, a perspective view of the cradle detached, and Fig. 3 a sectional view through the cradle and spool.

Like letters refer to like parts in each view.

A represents the sewing-machine arm, B the thread-guide, and C a vertical spindle mounted upon the arm A.

D represents the cradle, which is formed of any suitable material, and consists of two straight and parallel ends, a, and a curved piece, b, forming the sides and bottom.

It will be understood that I do not wish to limit myself to the manner of manufacturing this cradle, as any means can be resorted to for that purpose.

Upon the rear face of the cradle there is formed a vertical eye, E, which is adapted to fit over the spindle C and hold the cradle removably in place.

F represents the spool which is placed in the cradle, and G the thread, which passes from the spool over the front edge of the cradle to the guide B.

It will be found that this device forms a spool-cradle of simple construction—one from which the thread can be evenly and regularly fed, and from which the spool can be readily removed.

What I claim is—

A spool-cradle consisting of the receptacle having parallel ends and the curved sides and bottom provided with an eye at right angles to the axis of the cradle, and outside of the walls of the said cradle, as set forth.

In testimony whereof I affix my signature in presence of two witnesses.

CHARLES W. BANKS.

Witnesses:
GEORGE G. THOMSON,
RICHARD J. LENNON.